(12) United States Patent
Koeten et al.

(10) Patent No.: US 9,450,945 B1
(45) Date of Patent: Sep. 20, 2016

(54) UNIFIED ACCESS CONTROLS FOR CLOUD SERVICES

(75) Inventors: Robert Koeten, Menlo Park, CA (US); Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 94 days.

(21) Appl. No.: 13/463,664

(22) Filed: May 3, 2012

Related U.S. Application Data

(60) Provisional application No. 61/482,192, filed on May 3, 2011.

(51) Int. Cl.
*H04L 29/06* (2006.01)
*G06F 21/41* (2013.01)

(52) U.S. Cl.
CPC ........... *H04L 63/0815* (2013.01); *G06F 21/41* (2013.01)

(58) Field of Classification Search
CPC ............................ H04L 63/0815; G06F 21/41
USPC ...................... 726/1, 8, 12, 27–30
See application file for complete search history.

(56) References Cited

U.S. PATENT DOCUMENTS

| | | | |
|---|---|---|---|
| 7,444,476 B2 | 10/2008 | Gnanasabapathy et al. | |
| 7,620,978 B1 * | 11/2009 | Reddy | G06F 21/41 713/168 |
| 7,734,045 B2 | 6/2010 | Sandhu et al. | |
| 7,836,501 B2 | 11/2010 | Sobel et al. | |
| 7,870,294 B2 * | 1/2011 | Braddy et al. | 709/246 |
| 8,079,066 B1 | 12/2011 | Cordell et al. | |
| 8,091,138 B2 * | 1/2012 | Yellepeddy et al. | 726/26 |
| 8,285,681 B2 | 10/2012 | Prahlad et al. | |
| 8,312,270 B1 * | 11/2012 | Chou et al. | 713/168 |
| 8,341,744 B1 * | 12/2012 | Obrecht | G06F 21/41 713/188 |
| 8,347,388 B1 * | 1/2013 | Dutch | G06F 21/568 707/802 |
| 8,544,058 B2 * | 9/2013 | Lim | 726/1 |
| 8,813,174 B1 * | 8/2014 | Koeten et al. | 726/1 |
| 8,819,768 B1 | 8/2014 | Koeten et al. | |
| 9,087,189 B1 | 7/2015 | Koeten et al. | |
| 2004/0039945 A1 | 2/2004 | Oda | |
| 2006/0156385 A1 | 7/2006 | Chiviendacz et al. | |
| 2006/0182276 A1 | 8/2006 | Sandhu et al. | |
| 2007/0088683 A1 | 4/2007 | Feroglia et al. | |
| 2007/0136573 A1 | 6/2007 | Steinberg | |

(Continued)

OTHER PUBLICATIONS

Imprivata, Inc., Imprivata OneSign ® Release 4.1, A Platform Overview, 2008, pp. 1-36.

(Continued)

*Primary Examiner* — Joseph P Hirl
*Assistant Examiner* — J. Brant Murphy
(74) *Attorney, Agent, or Firm* — Wilmer Cutler Pickering Hale and Dorr LLP

(57) ABSTRACT

A cloud service access and information gateway receives, from a user device, a request to access a cloud service. The cloud service access and information gateway determines a context of the request and compares the context of the request to a cloud service access policy. If the context of the request satisfies the cloud service access policy, the cloud service access and information gateway determines a type of information associated with the request and compares the type of information associated with the request to an information control policy. If the type of information satisfies the information control policy, the cloud service access and information gateway grants the user device access to the cloud service.

26 Claims, 6 Drawing Sheets

(56) References Cited

U.S. PATENT DOCUMENTS

| | | |
|---|---|---|
| 2007/0214126 A1 | 9/2007 | Kikinis |
| 2008/0077982 A1 | 3/2008 | Hayler et al. |
| 2008/0083025 A1* | 4/2008 | Meijer et al. ............... 726/9 |
| 2008/0083040 A1* | 4/2008 | Dani et al. ................ 726/28 |
| 2008/0120685 A1* | 5/2008 | Comstock et al. ........... 726/1 |
| 2008/0181399 A1 | 7/2008 | Weise et al. |
| 2008/0222707 A1* | 9/2008 | Pathuri et al. ............... 726/4 |
| 2009/0070881 A1* | 3/2009 | Yellepeddy et al. ......... 726/26 |
| 2009/0199277 A1* | 8/2009 | Norman ............... H04L 63/105 726/5 |
| 2009/0249439 A1* | 10/2009 | Olden ................ H04L 63/0815 726/1 |
| 2009/0300706 A1* | 12/2009 | Ray et al. .................. 726/1 |
| 2010/0030746 A1 | 2/2010 | Steelberg et al. |
| 2010/0082713 A1 | 4/2010 | Frid-Nielsen et al. |
| 2010/0146583 A1* | 6/2010 | Prehofer et al. ............. 726/1 |
| 2010/0192196 A1 | 7/2010 | Lee |
| 2010/0202609 A1 | 8/2010 | Sandhu et al. |
| 2011/0113471 A1* | 5/2011 | Hjelm et al. ............... 726/1 |
| 2011/0196751 A1 | 8/2011 | Steelberg et al. |
| 2011/0209195 A1 | 8/2011 | Kennedy |
| 2011/0231670 A1* | 9/2011 | Shevchenko et al. ....... 713/189 |
| 2011/0239269 A1* | 9/2011 | Wahl et al. ................. 726/1 |
| 2012/0023544 A1* | 1/2012 | Li et al. ..................... 726/1 |
| 2012/0023554 A1 | 1/2012 | Murgia et al. |
| 2012/0023556 A1* | 1/2012 | Schultz et al. ............... 726/4 |
| 2012/0023568 A1 | 1/2012 | Cha et al. |
| 2012/0131336 A1 | 5/2012 | Price et al. |
| 2012/0167197 A1* | 6/2012 | Kruger .................. G06F 12/00 726/16 |
| 2012/0204221 A1* | 8/2012 | Monjas Llorente et al. ..... 726/1 |
| 2012/0222084 A1 | 8/2012 | Beaty et al. |
| 2012/0272249 A1 | 10/2012 | Beaty et al. |
| 2012/0297190 A1 | 11/2012 | Shen et al. |

OTHER PUBLICATIONS

Citrix, Thread: Two factor authentication based on source IP address, Oct. 14-15, 2010, http://forums.citrix.com/message.jspa?messageID=1502780.

SonicWall, Inc., SonicWall Aventail, Eclass Secure Remote Access Installation and Administration Guide Version 10.5, Dec. 3, 2009.

Wikipedia, Apple ID http://en.wikipedia.org/wiki/Apple_ID, retrieved Nov. 2, 2012.

"Check Point Introduces New Line of Security Management Appliance Based on the Software Blade Architecture", May 26, 2009, http://www.checkpoint.com/press/2009/s,art-1052609.html.

USPTO, Office Action for U.S. Appl. No. 13/341,197, mailed Jun. 25, 2013.

USPTO, Office Action for U.S. Appl. No. 13/341,197, mailed Oct. 15, 2013.

USPTO, Office Action for U.S. Appl. No. 13/341,197, mailed Dec. 30, 2013.

USPTO, Office Action for U.S. Appl. No. 13/341,202, mailed Apr. 2, 2013.

USPTO, Office Action for U.S. Appl. No. 13/341,202, mailed Oct. 15, 2013.

USPTO, Office Action for U.S. Appl. No. 13/341,202, mailed Dec. 17, 2013.

USPTO, Office Action for U.S. Appl. No. 13/341,205, mailed Apr. 5, 2013.

USPTO, Office Action for U.S. Appl. No. 13/341,205, mailed Oct. 23, 2013.

USPTO, Office Action for U.S. Appl. No. 13/341,205, mailed Jan. 3, 2014.

USPTO, Office Action for U.S. Appl. No. 13/463,672, mailed Aug. 8, 2013.

USPTO, Office Action for U.S. Appl. No. 13/463,672, mailed Feb. 19, 2014.

USPTO, Office Action for U.S. Appl. No. 13/341,197, mailed Apr. 14, 2014.

USPTO, Notice of Allowance for U.S. Appl. No. 13/341,202, mailed Apr. 10, 2014.

USPTO, Notice of Allowance for U.S. Appl. No. 13/341,205, mailed Apr. 21, 2014.

USPTO, Office Action for U.S. Appl. No. 13/341,197, mailed Aug. 6, 2014.

USPTO, Office Action for U.S. Appl. No. 13/341,197, mailed Nov. 26, 2014.

USPTO, Notice of Allowance for U.S. Appl. No. 13/341,197, mailed Mar. 17, 2015.

USPTO, Office Action for U.S. Appl. No. 13/463,672, mailed Nov. 12, 2014.

USPTO, Office Action for U.S. Appl. No. 13/463,672, mailed Jun. 1, 2015.

* cited by examiner

UNIFIED ACCESS CONTROLS FOR CLOUD SERVICES

RELATED APPLICATIONS

This application is related to and claims the benefit of U.S. Provisional Patent Application No. 61/482,192, filed May 3, 2011, which is hereby incorporated by reference herein.

FIELD

Embodiments of the invention relate to cloud services, and in particular to unified access controls for cloud services.

BACKGROUND

Network Access Control (NAC) is a computer networking solution that uses a set of protocols to define and implement a policy that describes how to secure access to network nodes by devices when they initially attempt to access the network. NAC might integrate the automatic remediation process (fixing non-compliant nodes before allowing access) into the network systems, allowing the network infrastructure such as routers, switches and firewalls to work together with back office servers and end user computing equipment to ensure the information system is operating securely before interoperability is allowed. Network Access Control aims to control access to a network with policies, including pre-admission endpoint security policy checks and post-admission controls over where users and devices can go on a network and what they can do.

When a computer connects to a computer network, it is not permitted to access anything unless it complies with a business defined policy. Once the policy is met, the computer is able to access network resources and the Internet, according to the policies defined within the NAC system. Access to the network will be given according to profile of the person. For example, in an enterprise, a member of the human resources department may access only human resources department files.

Organizations may offer one or more cloud services to users over a network (e.g., the Internet). The cloud services may include computation, software, data access, storage services, etc. that physically reside elsewhere (e.g., another computer or the organizations data center) which users can access from their own computer or device over the network. Since sensitive information may be sent to or received from these cloud services, corporate policy may dictate that a user have a certain level of security or protection on the device being used to access the cloud services. Given the myriad of different devices and networks an individual may use to access these cloud services and the different types of information that may be transmitted, implementing a consistent and secure access policy may be difficult.

SUMMARY

A method and apparatus for unified access controls for cloud services is described. In one embodiment, cloud service access and information gateway receives, from a user device, a request to access a cloud service. The cloud service access and information gateway determines a context of the request and compares the context of the request to a cloud service access policy. If the context of the request satisfies the cloud service access policy, the cloud service access and information gateway determines a type of information associated with the request and compares the type of information associated with the request to an information control policy. If the type of information satisfies the information control policy, the cloud service access and information gateway grants the user device access to the cloud service. If the context of the request does not satisfy the cloud service access policy, the cloud service access and information gateway denies the request.

In one embodiment, the context of the request may include at least one of an identity of a user, a type of the user device, a type of network, and a type of the cloud service. The type of the cloud service may include at least one of a public cloud service and a private cloud service. The type of the user device may include at least one of a managed user device and an unmanaged user device. The type of network may include at least one of a secure network and an unsecure network.

In one embodiment, the type of information associated with the request may include at least one of confidential information and public information. When comparing the type of information associated with the request to the information control policy, the cloud service access and information gateway may determine if the type of information is restricted. If the type of information is restricted, the cloud service access and information gateway may determine if the context of the request meets a requirement of the information control policy. If the context of the request does not meet the requirement of the information control policy; the cloud service access and information gateway may determine if the requirement can be satisfied. If the type of information is not restricted, the cloud service access and information gateway may grant the user device access to the cloud service. If the context of the request does meet the requirement of the information control policy, the cloud service access and information gateway may grant the user device access to the cloud service. If the requirement can be satisfied, the cloud service access and information gateway may perform an action to satisfy the condition. In one embodiment, the action may include encrypting the information associated with the request. If the requirement cannot be satisfied, the cloud service access and information gateway may encrypt the information associated with the request In addition, a system for unified access controls for cloud services is described. An exemplary system may include a memory and a processor coupled with the memory. In one embodiment, the processor receives, from a user device, a request to access a cloud service. The processor determines a context of the request and compares the context of the request to a cloud service access policy. If the context of the request satisfies the cloud service access policy, the processor determines a type of information associated with the request and compares the type of information associated with the request to an information control policy. If the type of information satisfies the information control policy, the processor grants the user device access to the cloud service.

Further, a computer-readable storage medium network for unified access controls for cloud services is described. An exemplary computer readable storage medium provides instructions, which when executed by a processor causes the processor to perform a method such as the exemplary methods discussed above.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for unified access controls for cloud services. In certain embodiments, a unified access control system integrates cloud identity and access management with an associated information security gateway, in a way such that an individual or organization can define, aggregate and enforce identity, device, information and service centric policies in a uniform, consistent fashion irrespective of the context of a cloud service access request. This means that whether a user accesses the cloud service with their personal or corporate credentials, from a managed or unmanaged device, from a known or unknown network or for personal or corporate related purposes, the same access and information control policies may be used. The unified access control system combines of a cloud federated single sign-on (SSO) solution with an information gateway, having the capability to grant or decline cloud service access and/or information access, transfer, or transformation based on a users validated identity, device and network context (e.g. managed device through an unknown network), information classification policy context and cloud service context (e.g. web portal vs. financial mgmt application). This may be advantageous compared to conventional systems that separate service access grants and content inspection solutions.

Figure 1:
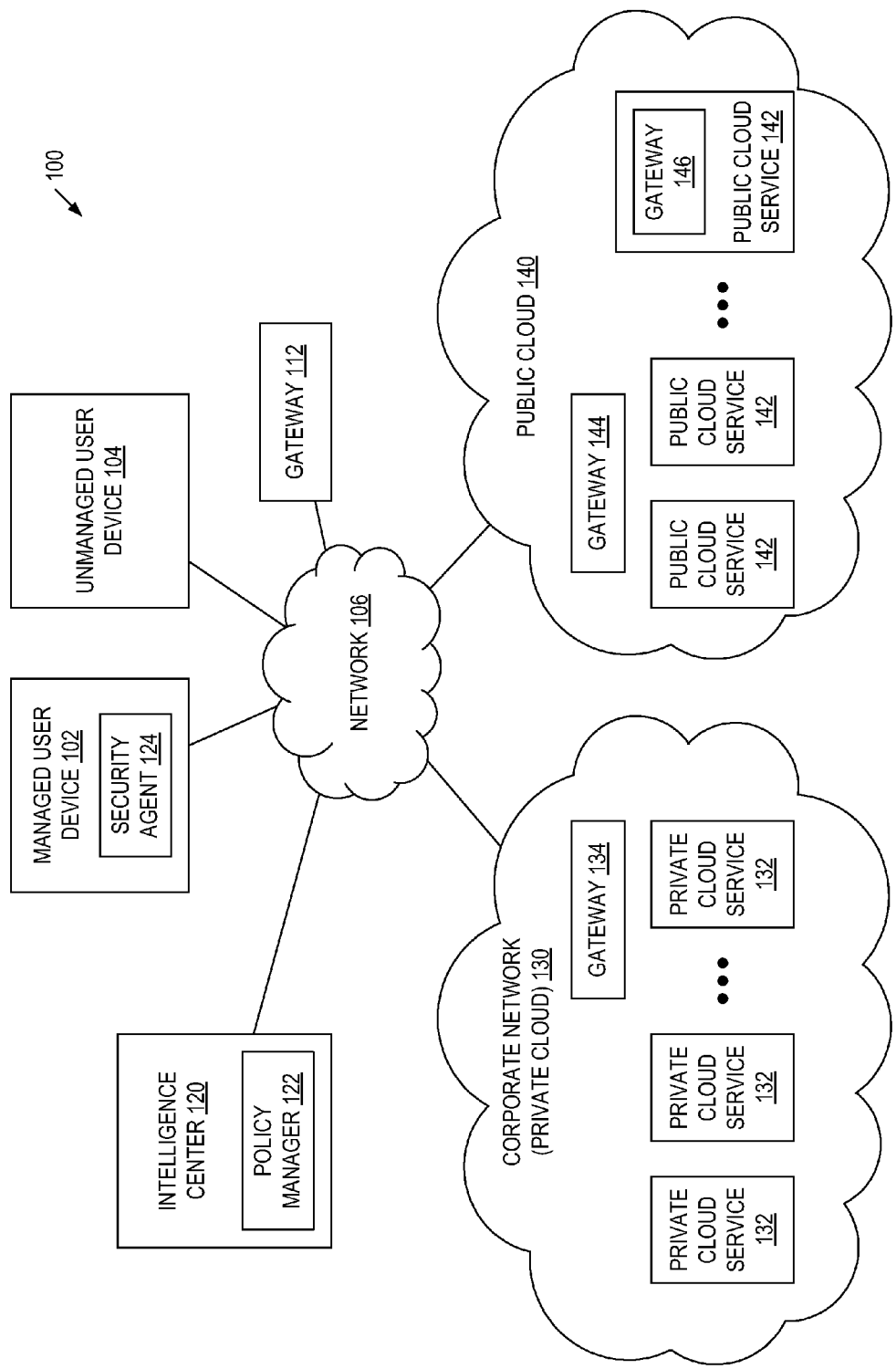
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include corporate network (i.e., private cloud) 130, public cloud 140 (including services not managed by the corporation and included in private cloud 130) and one or more user devices 102, 104 capable of communicating with the corporate network 130 and public cloud 140 via a network 106. Network 106 may include, for example, a private network such as a local area network (LAN), a wide area network (WAN), a global area network (GAN) such as the Internet, or a combination of such networks, and may include a wired or wireless network.

The user devices 102, 104 may be portable computing devices such as laptop or tablet computers. Other examples of portable computing devices include cellular telephones (e.g., smartphones), personal digital assistants (PDAs), portable media players, netbooks, and the like. The user devices 102, 104 may also be non-portable computing devices such as desktop computers, set-top boxes associated with a television, gaming consoles, and so on. The user devices 102, 104 may be variously configured with different features to enable access to the various cloud services 132, 142 made available by corporate network 130 and public cloud 140.

In one embodiment, the user devices are categorized as managed user devices 102 and unmanaged user devices 104. Managed user devices 102 may include devices provided by the organization or corporation that manages corporate network 130. For example, if a user is an employee of a corporation, the corporation may issue the employee a laptop computer and a smartphone. These devices may or may not be owned by the corporation, but as long as the corporation maintains an element of control over the devices, they may qualify as managed user devices 102. In some embodiments, the corporation may have control over what applications or programs are installed and run on managed user devices 102. For example, managed user devices 102 may have a security agent 124 installed thereon to monitor data sent to and from the managed user device 102, to encrypt or decrypt data transmissions, identify threats or suspicious behavior, etc. In other embodiments, the corporation may exert other forms of control over managed user devices 102.

Unmanaged user devices 104 may include all other user devices that do not qualify as managed user devices 102. Unmanaged user devices 104 may include personal devices owned by the user or employee. For example, unmanaged user devices 104 may include a user's home computer or personal cell phone. Generally, the corporation has no control over what applications and programs are installed and run on unmanaged user devices 104, and unmanaged user devices 104 would not typically include security or data loss prevention software, such as security agent 124. In some embodiments, both managed user devices 102 and unmanaged user devices 104 may be used to access various available cloud services.

Cloud computing may refer to the access of computing resources over a computer network. A common shorthand for a cloud computing service (or an aggregation of all existing cloud services) is "the cloud." Cloud computing allows for a functional separation between the computing resources used and the physical machine where the user is working. The computing resources may reside in a local network or outside the local network, for example, in an internet connected datacenter. A user may access the resources in the cloud (e.g., corporate network 130 or public cloud 140) using a personal computer (PC), workstation, laptop computer, mobile phone, personal digital assistant (PDA), tablet computer or the like, including managed user device 102 and/or unmanaged user device 104. The principle behind the cloud is that any computer connected to the Internet, or other network, is connected to the same pool of computing power, applications, and files. For example, users can store and access personal files, such as music, pictures, videos, and bookmarks, play games, or use productivity applications and cloud services on a remote server rather than physically carrying around a storage medium such as a DVD or hard drive.

Since the cloud is the underlying delivery mechanism, cloud based applications and services may support any type of software application or service in use today. All of the development and maintenance tasks involved in provisioning the applications are performed by a service provider (e.g., the corporation). The user's computer may contain very little software or data (perhaps a minimal operating system and web browser only), serving as little more than a display terminal for processes occurring on a network of computers, potentially located far away. Cloud computing frees users from certain hardware and software installation and maintenance tasks through the use of simpler hardware that accesses a vast network of computing resources (processors, servers, data storage devices, etc.). The sharing of resources reduces the cost to individuals and users may routinely use data intensive applications and services driven by cloud technology which were previously unavailable due to cost and deployment complexity.

Corporate network 130 and public cloud 140 may each include a group of networked computing resources accessible to the user devices 102, 104 over network 106. The resources available in corporate network 130 and public cloud 140 may include, for example, processing devices, storage devices, applications, or other resources. In one embodiment, corporate network 130 may be a private cloud that is operated solely for a single organization, such as a corporation. Corporate network 130 may be managed internally by the corporation or by a third-party, and may be hosted internally or externally. Public cloud 140 may represent cloud computing in the more traditional sense, where resources are dynamically provisioned to the general public on a fine-grained, self service basis. Public cloud 140 may provide services and resources from a variety of service providers and may be jointly managed by the providers or managed by a third-party.

In one embodiment, corporate network 130 may include one or more private cloud services 132. Private cloud services 132 may include applications or programs made available to users of user devices 102, 104. Private cloud services 132 may include services created by the organization that manages corporate network 130 (e.g., the corporation) and/or services created by a third party, but provided and managed by the corporation for its users (e.g., employees). Private cloud services 132 may include, for example, an email service, a document management service, a customer relationship management (CRM) service, a video communication service, or some other cloud service. Select users may be afforded access to private cloud services 132 in corporate network 130 using managed user devices 102 or unmanaged user devices 104 over network 106.

In one embodiment, public cloud 140 may include one or more public cloud services 142. Public cloud services 142 may include applications or programs made available to users of user devices 102, 104. Public cloud services 142 may include services created, provided and managed by a variety of different organizations or service providers. Each public cloud service 142 may be used by a user for either personal or business purposes, and some public cloud services 142 may be used for both purposes. Public cloud services 142 may include similar and/or different services as private cloud services 132, such as for example, an email service, a document management service, a social networking service, a customer relationship management (CRM) service, or some other cloud service. When compared to corporate network 130, a larger portion of users (or in one embodiment, all users of the Internet) may be afforded access to public cloud services 142 in public cloud 140 using managed user devices 102 or unmanaged user devices 104.

Network architecture 100 may also be designed with security features to protect access to private services and confidential information maintained by an organization. Confidential information may be stored in a structured form such as a database, a spreadsheet, etc., and may include, for example, customer, employee, patient or pricing data. In addition, confidential information may include unstructured data such as design plans, source code, financial reports, human resources reports, customer or patient reports, pricing documentation, corporate mergers and acquisitions documentation, government (e.g. Securities and Exchange Commission) filings, and any other confidential information that requires restricted user access. In one embodiment, the security may be implemented by intelligence center 120, and a series of one or more cloud service access and information gateways 112, 134, 144, 146.

The security features may protect confidential information using policies, which may be controlled by policy manager 122 in intelligence center 120. In one embodiment, intelligence center 120 may be a computing system or a series of computing systems managed, for example, by the organization which manages corporate network 130. In one embodiment, intelligence center 120 may be separate from corporate network 130 as shown. In other embodiments, however, intelligence center 120 may be implemented using computing resources inside corporate network 130. Additional details of policy manager 122 are provided below with respect to FIG. 2.

The design of the security features may allow a user or system administrator to define, aggregate and enforce identity, device, information and service centric policies in a uniform, consistent fashion irrespective of whether a user accesses a cloud service with their personal or corporate credentials, from a managed or unmanaged device, from a known or unknown network, or for personal or corporate related purposes. The system combines a cloud federated single sign-on (SSO) solution with the cloud service access and information gateways 112, 134, 144, 146 and the capability to grant or decline cloud service access and/or information access/transfer/transformation based on an individual's validated identity, device and network context (e.g. managed device through an unknown network), information classification policy context and the cloud service context (e.g. web portal vs. financial management application).

The cloud service access and information gateways 112, 134, 144, 146 may serve as policy enforcement points to enforce the policies set by policy manager 122. For example, a request to access a cloud service, such as private cloud service 132 or public cloud service 142, may be passed through one of the cloud service access and information gateways. The cloud service access and information gateway may compare the request to the conditions of the applicable policy, and enforce an action based on the result of the comparison. The action may include, for example, allowing the request, denying the request, modifying the request, or some other action. In one embodiment, network architecture 100 may include one or more cloud service access and information gateways located at various different locations. For example, cloud service access and information gateway 112 may be connected to or be a part of network 106.

Communication between the user devices 102, 104 and corporate network 130 and public cloud 140 may be enabled via any communication infrastructure. One example of such an infrastructure includes a combination of a wide area network (WAN) and wireless infrastructure, which allows a user to access the could services. The wireless infrastructure may be provided by one or multiple wireless communications systems. In one embodiment, the wireless communication system may be a wireless fidelity (WiFi) hotspot connected with the network 106. The wireless communication system may also be a wireless carrier system that can be implemented using various data processing equipment, communication towers, etc. Alternatively, or in addition, the wireless carrier system may rely on satellite technology to exchange information with the user devices 102, 104. Cloud service access and information gateway 112 may implemented as part of this infrastructure, such that all communications are able to be intercepted by the gateway 112.

In another embodiment, cloud service access and information gateways may be alternatively or additionally located within corporate network 130, such as gateway 134, and within public cloud 140, such as gateway 144. Since all network traffic passes through one of the gateways, during peak times of high traffic, a bottleneck may form reducing response times. Placing the gateways 134, 144 within corporate network 130 and public cloud 140 respectively, can alleviate this bottleneck, because the amount of traffic passing through each gateway is reduced. Gateway 134 need only handle traffic intended for private cloud services 132 and gateway 144 need only handle traffic intended for public cloud services 142. In another embodiment, gateway 146 may be alternatively or additionally located within a cloud service, such as for example, public could service 142. Additional details of cloud service access and information gateways 112, 134, 144, 146 are provided below with respect to FIG. 3.

Figure 2:
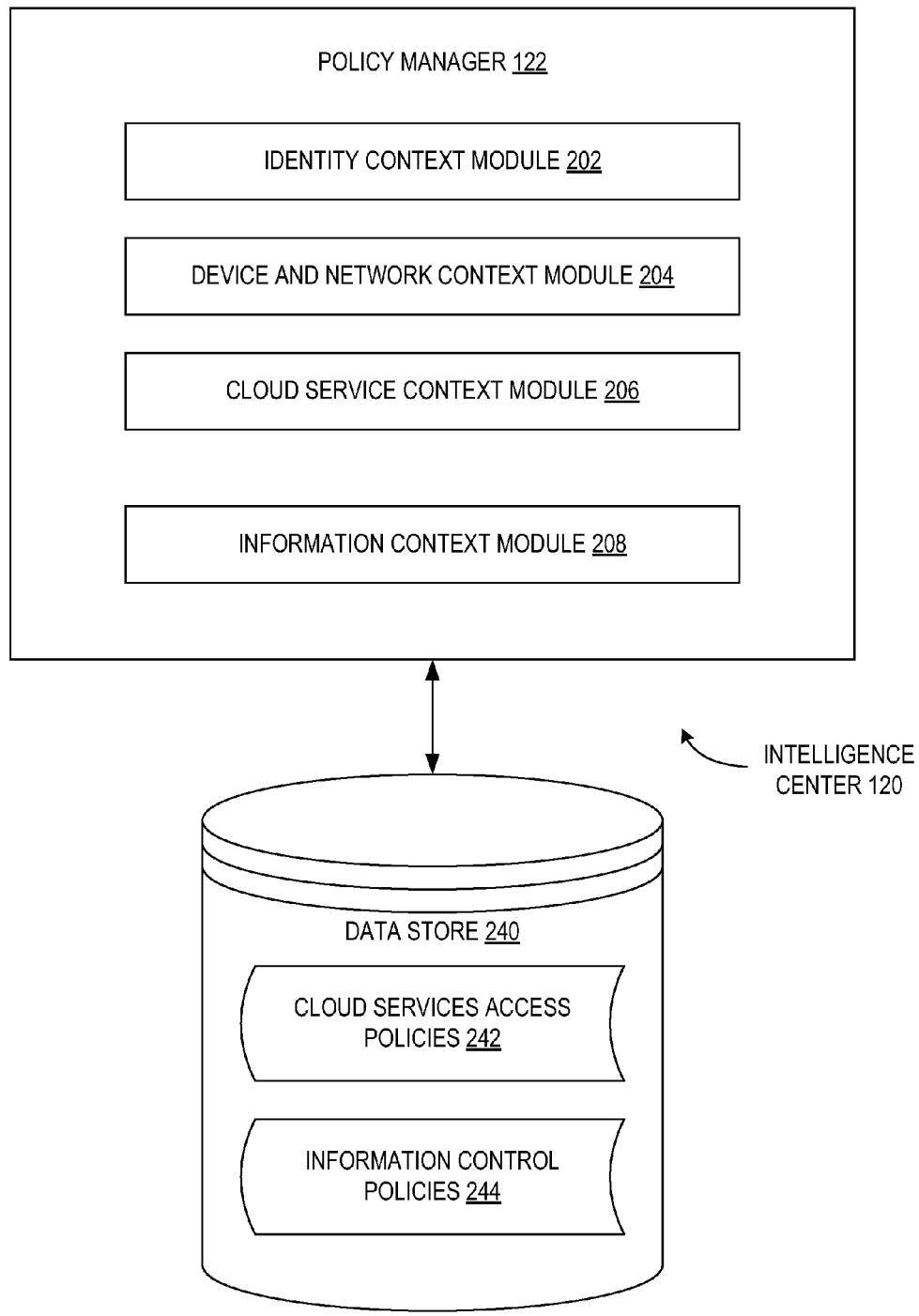
FIG. 2 is a block diagram illustrating a network access control policy manager, according to an embodiment.

FIG. 2 is a block diagram of one embodiment of policy manager 122 that is included in intelligence center 120. In one embodiment, policy manager 122 may include identity context module 202, device and network context module 204, cloud service context module 206, and information context module 208. In other embodiments, policy manager 122 may include more or fewer components. In one embodiment, policy manager 122 is connected to a data store 240, which may be a file system, database or other data management layer resident on a data storage device such as a disk drive, RAM, ROM, database, etc.

Policy manager may be responsible for defining and managing a set of policies for controlling access to the various cloud services in a network, such as private could services 132 and public could services 142. The resulting policies may be stored in data store 240, for example, as cloud services access policies 242. The policies 242 may be specifically defined for certain access requests or indirectly defined based on a number of factors or contexts. For example, a request that has a certain combination of factors may be treated according to a certain policy. The policies 242 may be created or defined, for example, by a user, system administrator, or other person or entity.

Identity context module 202 is concerned with the identity of the user making a request to access a cloud service and/or cloud information. Regardless of the device used to make the request (e.g., managed user device 102 or unmanaged user device 104), a user may identify himself using login credentials. The login credentials may include, for example, a user name and password. In one embodiment, the login credentials are part of a single sign-on (SSO) system. SSO is a property of access control of multiple related, but independent software systems (e.g., private cloud services 132 and public cloud services 142). With SSO, the user logs in once and gains access to all (or a certain subset) of the services without being prompted to log in again at each of them. As different services may support different authentication mechanisms, using SSO, the gateway may internally translate and store different credentials compared to what is used for the initial SSO login.

In one embodiment, the login credentials provided by the user may vary depending on the user status. For example, the user may have a certain user name or login if the user is a member of a first group, such as being an employee of the corporation that manages corporate network 130. If the user is not a member of the first group, the user may have a different set of login credentials, identifying the user as such. In addition, the login credentials may provide other information about the user, such as rank, title, position, or other information. Identity context module 202 may interpret different forms of login information to determine the associated identity of a user with those login credentials, and define a corresponding policy. For example, in one embodiment, only users who are employees of the corporation may be allowed to access private cloud services 132, while non-employees are denied access.

Device and network context module 204 is concerned with the type and status of device and network from which a request to access a cloud service is made. As discussed above, user devices are generally categorized as managed user devices 102 or unmanaged user devices 104, including publicly shared user devices. The corporation, or other organization, may have some element of control over managed user device 102, such as requiring that some security software be installed on the managed user device 102, such as security agent 124. Security agent 124 may ensure that the information transferred to and from managed user device 102 is safe and secure. Thus, in one embodiment, device and network context module 204 may define a policy that allows any communication from a managed user device 102 to private or corporate cloud services 132. Requests to access cloud services from an unmanaged user device 104 may be denied, according to the policy. In another embodiment, the policy may dictate that such requests from unmanaged user devices 104 be additionally encrypted or otherwise secured.

The network 106 through which the request to access a cloud service is made may also be considered by device and network context module 204. Network 106, may be for example, a secured or unsecured LAN, a WAN, a mobile telecommunications network, or some other network. Device and network context module 204 may define certain access policies 242 based on the type of network as well. For example, only requests from secure networks may be granted access to private cloud services 132. In another embodiment, the location of the network may also be considered when defining the policy. For example, a request made over a wireless network in the United States may be allowed access to certain cloud services, while a request made over a wireless network in Europe may only be granted for a different set of cloud services.

Cloud service context module 206 is concerned with the type of cloud service for which access is requested. As discussed above, cloud services are generally categorized as private cloud services 132 or public cloud services 142. Private cloud services 132 may include services created by the organization that manages corporate network 130 (e.g., the corporation) and/or services created by a third party, but provided and managed by the corporation for its users (e.g., employees). Public cloud services 142 may include services created, provided and managed by a variety of different organizations or service providers. The cloud service context may also be affected by the type of service requests (e.g., read, write, delete) as well as a service subdomain (e.g., the scope of the requested information) as determined by a more granular URL or URI. The policies 242 may allow access to the different cloud services based on any combination of one or more of the other contexts. For example, a policy may only allow access to private cloud services 132 from a managed user device 102 or over a secured network. One of skill in the art would recognize that there are many other possible combinations that could form the policies beyond those described herein.

Information context module 208 is concerned with the type of information which is requested to or sent from a cloud service. The information may be classified in any number of different ways, such as corporate or personal, confidential or public, critical or non-critical, etc. Information context module 208 may define certain information control policies 244 based on the type of information being communicated. In one embodiment, information control policies 244 may define certain actions (e.g., allow, deny, encrypt, etc.) for requests involving certain types of information depending on the context of the request. The context may include the identity of the requestor, the device and network from which the request was received and the associated cloud service, as defined by modules 202-206 above. Each of the different contexts, including the information context, may be combined with one or more other contexts when defining the policies 242 and 244. In one embodiment, with respect to the information context, a policy 244 may allow corporate data only to be received by a managed user device 102 or sent only to an employee of the corporation. This is merely one example of a situation covered by information control policies 244 and one of skill in the art would recognize that there are many other situations besides this once and the other examples provided below.

In one embodiment, policy manager 122 creates and manages the policies, such as cloud services access policies 242 and information control policies 244 and distributes them to the policy enforcement points (e.g., gateways 112, 134, 144, 146). The policies may be sent to the enforcement points periodically, according to a predefined schedule, each time a change or update is made to one of the policies 242, 244, or in response to a request from a user or system administrator. This may ensure that the gateways 112, 134, 144, 146 are able to make access decisions based on the most recent up-to-date policies.

Figure 3:
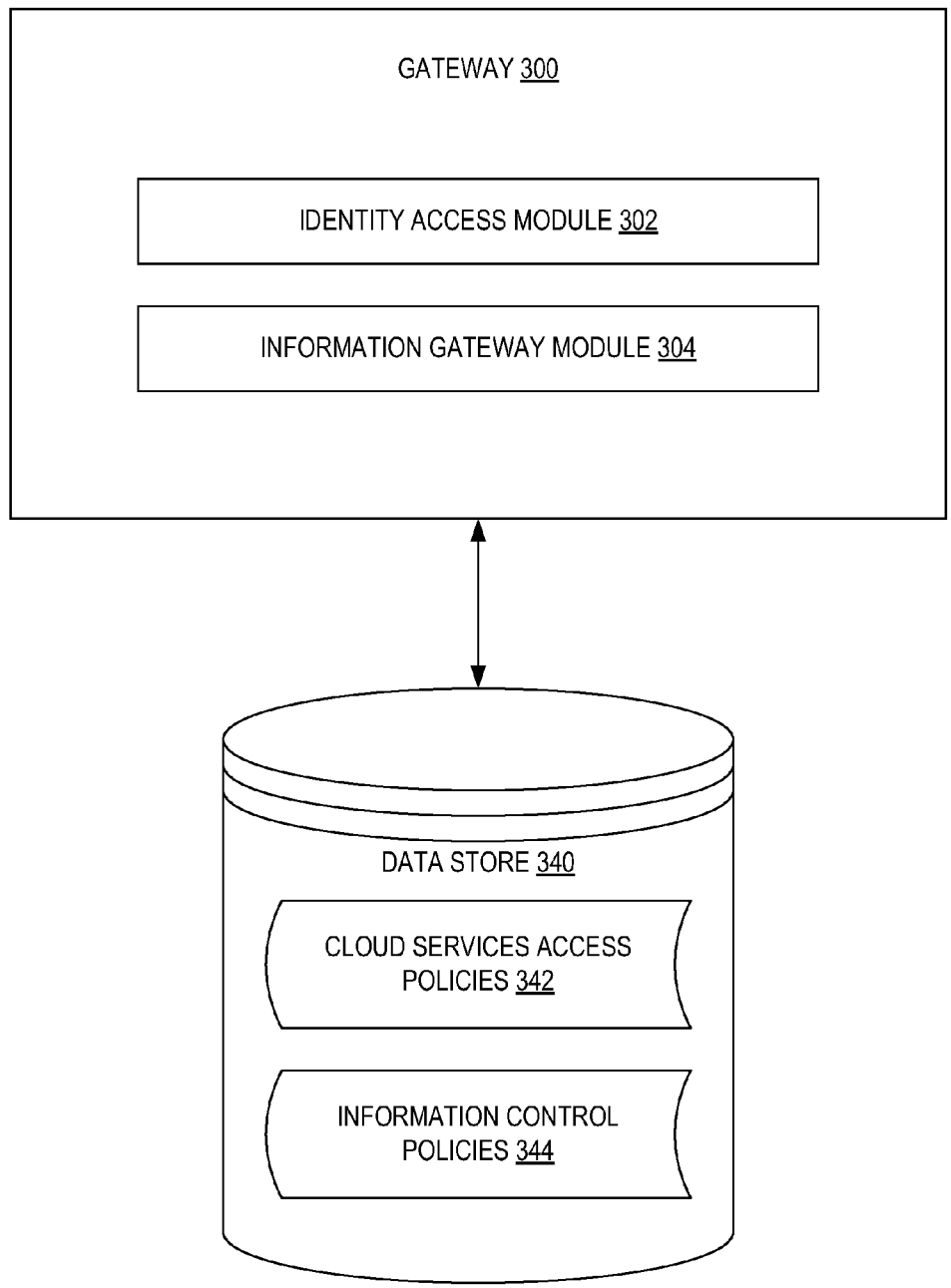
FIG. 3 is a block diagram illustrating a cloud service access and information gateway, according to an embodiment.

FIG. 3 is a block diagram illustrating a cloud service access and information gateway, according to an embodiment of the present invention. In one embodiment, gateway 300 may include identity access module 302, and cloud service access and information gateway module 304. In other embodiments, gateway 300 may include more or fewer components. Cloud services access and information gateway 300 may be representative of any of cloud service access and information gateways 112, 134, 144, 146, as shown in FIG. 1, and may be located, for example, in network 106, corporate network 130, public cloud 140, in a cloud service, such as public cloud service 142, or elsewhere. In one embodiment, gateway 300 is connected to a data store 340, which may be a file system, database or other data management layer resident on a data storage device such as a disk drive, RAM, ROM, database, etc.

In one embodiment, gateway 300 may intercept or otherwise receive an access request. The request may be sent, for example, by managed user device 102 or unmanaged user device 104 to access a cloud service, such as private cloud service 132 or public cloud service 142. In one embodiment, the request may include information about the requestor and/or other data, such as an identity of the user making the request, information about the device and network from which the request was made, including security information from the user device, a type of information being transmitted or requested, an indication of the cloud service to which the request is directed, and/or other information. Gateway 300 may use this information to make an access determination according to one or more access policies, such as cloud services access policies 342 and information control policies 344, which may be stored in data store 340. Cloud services access policies 342 and information control policies 344 may be generated and distributed by a policy manager, such as policy manager 122 in intelligence center 120.

Upon receiving the access request, identity access module 302 examines the request and makes a determination of which of cloud services access policies 342 are applicable. In one embodiment, identity access module 302 identifies an identity of the user making the request, information about the device from which the request was made, including security information from the user device and information about the network on which the request was received. In response, identity access module 302 may determine if the request should be allowed for a given cloud service according to the policies 342. For example, identity access module 302 may determine that the request is received from an employee of the corporation, on a managed device, such as managed user device 102, and received on a secure wireless network 106. The policy 342 may dictate that a request with that particular combination of features should be allowed for either private cloud services 132 or public cloud services 142. In one embodiment, the policy 342 may specify individual cloud services that may or may not be accessed, rather than just a class of services.

In one embodiment, either before or after, or in some cases at the same time that identity access module 302 verifies the identity of the request, cloud service access and information gateway module 304 may examine the request and make a determination of whether to allow the request based on policies 344. Cloud service access and information gateway module 304 may identify a type of information that the access request is either sending to a cloud service or requesting from the cloud service. The information may be classified in any number of different ways, such as corporate or personal, confidential or public, critical or non-critical, etc. For example, cloud service access and information gateway module 304 may determine that the user is attempting to download corporate sales data from a private cloud service 132. In one embodiment, the information control policy 344 may specify that such information is allowed to be downloaded by corporate employees, or by anyone using a managed user device 102, or by some combination of these or other factors.

In one embodiment, information gateway module 304 may identify the type of information in the request using fingerprinting techniques. The fingerprinting process may include accessing and extracting text and data managed by a cloud service. The data may be normalize and secured using a nonreversible hash. When a request is received for a file or other data, information gateway module 304 make generate a fingerprint (e.g., hash) of that file or contents of that file and compare it to stored fingerprints of sensitive information. In one embodiment, these fingerprints may be stored in data store 340. If a match is found, then information gateway module 304 may identify the requested file as containing sensitive information. In that case, the appropriate information control policies 344 may be applied.

In another embodiment, information gateway module 304 may identify the type of information in the request using describing technology. Describing technology protects sensitive data by identifying matches to keywords, expressions or patterns, and file types, and by performing other signature-based detection techniques. For example a database of sensitive files may define one or more key words and/or regular expressions for each file. This database may be stored in data store 340. Information gateway module 304 may determine whether any information in a requested file matches the key words and/or regular expressions. If a match is found, then information gateway module 304 may identify the requested file as containing sensitive information. In that case, the appropriate information control policies 344 may be applied.

Figure 4:
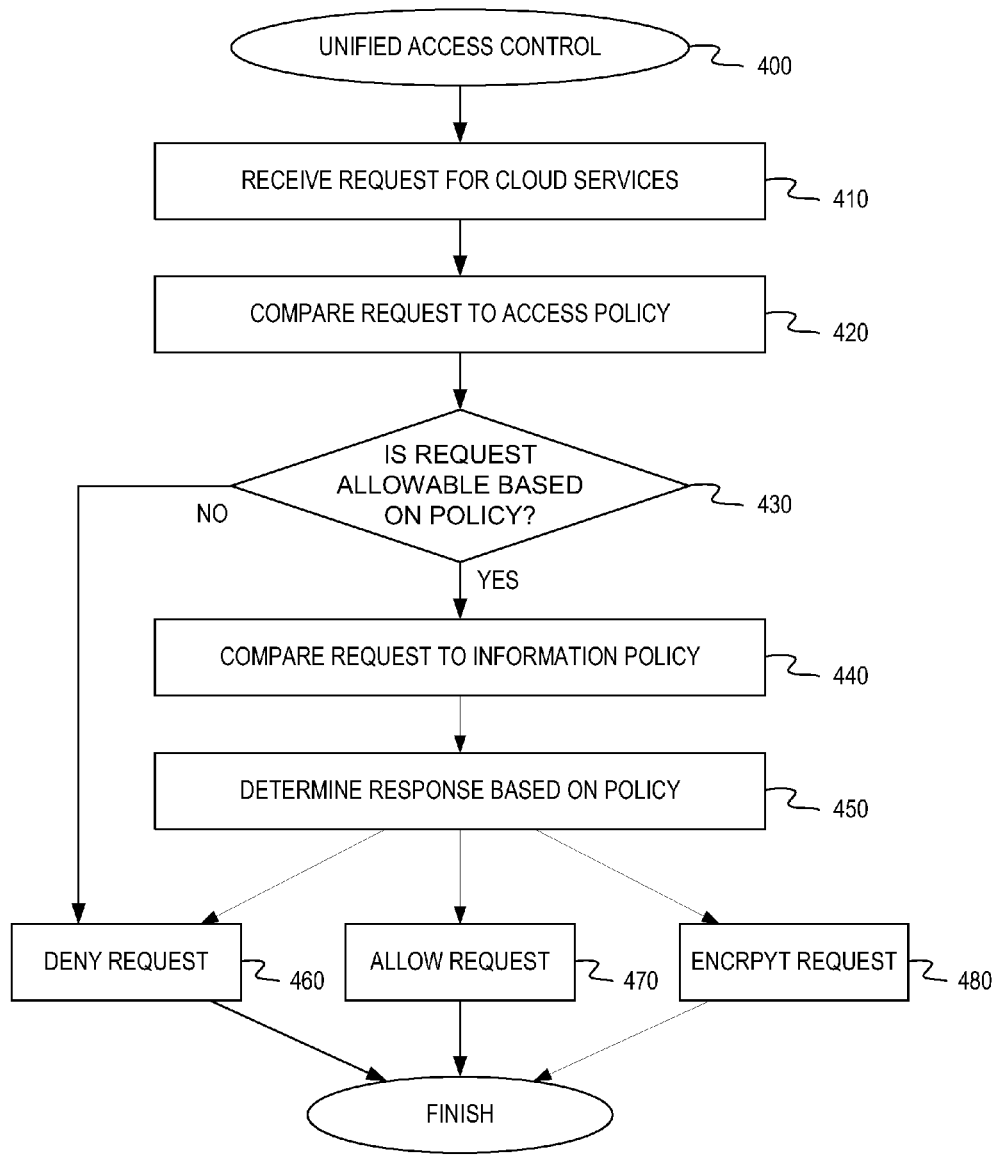
FIG. 4 is a flow diagram illustrating a unified access control method for cloud services, according to an embodiment.

FIG. 4 is a flow diagram illustrating a unified access control method for cloud services, according to an embodiment of the present invention. The method 400 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor requests for access to cloud services made by user devices. In one embodiment, method 400 may be performed by cloud service access and information gateway 300, as shown in FIG. 3.

Referring to FIG. 4, at block 410, method 400 receives a request to access cloud services. In one embodiment, the request may be sent by a user device, such as managed user device 102 or unmanaged user device 104. The request may be for access to a cloud service, such as private cloud services 132 or public cloud services 142. In one embodiment, cloud service access and information gateway 300, which may include for example one of gateways 112, 134, 144 or 146, may intercept or otherwise receive the access request of the user device.

At block 420, method 400 may analyze the request based on a set of one or more access policies, such as cloud services access policies 342. Cloud services access policies 342 may include policies generated and distributed by a policy manager, such as policy manager 122 in intelligence center 120. The policies 342 may be sent to gateway 300 periodically, according to a predefined schedule, each time a change or update is made to one of the policies, or in response to a request from a user or system administrator.

At block 430, method 400 determines whether the request is allowable based on the cloud services access policy 342. In one embodiment, identity access module 302 of gateway 300 identifies an identity of the user making the request, information about the device from which the request was made and information about the network on which the request was received. In response, identity access module 302 may determine if the request should be allowed for a given cloud service according to the policy 342. For example, the policy 342 may specify that a request with a particular combination of features should or shout not be allowed for either private cloud services 132 or public cloud services 142.

If at block 430, method 400 determines that the request is allowable based on cloud services access policy 342, at block 440, method 400 may analyze the request based on information control policies 344. Cloud service access and information gateway module 304 may identify a type of information that the access request is either sending to a cloud service or requesting from the cloud service. The information may be classified in any number of different ways, such as corporate or personal, confidential or public, critical or non-critical, etc. In one embodiment, the policy 344 may specify that certain types of information are allowed to be downloaded or uploaded by certain users on certain devices networks, etc, to or from certain cloud services. Cloud service access and information gateway module 304 may compare this context of the request to the scenarios specified in the information control policy 344.

At block 450, method 400 may determine an appropriate response to the request based on the information control policy 344. For example, the policy 344 may specify that request for certain types of information (e.g., confidential) be denied if they are received from a unmanaged user device 104 or over an unsecure network. In addition, if at block 430, method 400 determines that the access should not be granted for the requested cloud service, at block 460 method 400 may also deny the access request. As a result, the requesting device is not allowed to access the cloud service or receive the requested information. In another embodiment, at block 470, method 400 may allow the request based on the context. For example, if the request is for confidential information and received from a managed device 102 or is for publicly available information, it may be allowed. Gateway 300 may forward the request for access to the intended cloud service, such as private cloud service 132 or public cloud service 142, and the requested information may be returned. In another embodiment, at block 480, method 400 may take some other action before the request is processed. For example, the policy 344 may specify that certain requests, such as those for confidential corporate information be additionally encrypted or otherwise secured. In such a case, information gateway module 304 may encrypt the requested confidential information before providing it to the requestor. In other embodiments, some other action besides encrypting may be performed.

Figure 5:
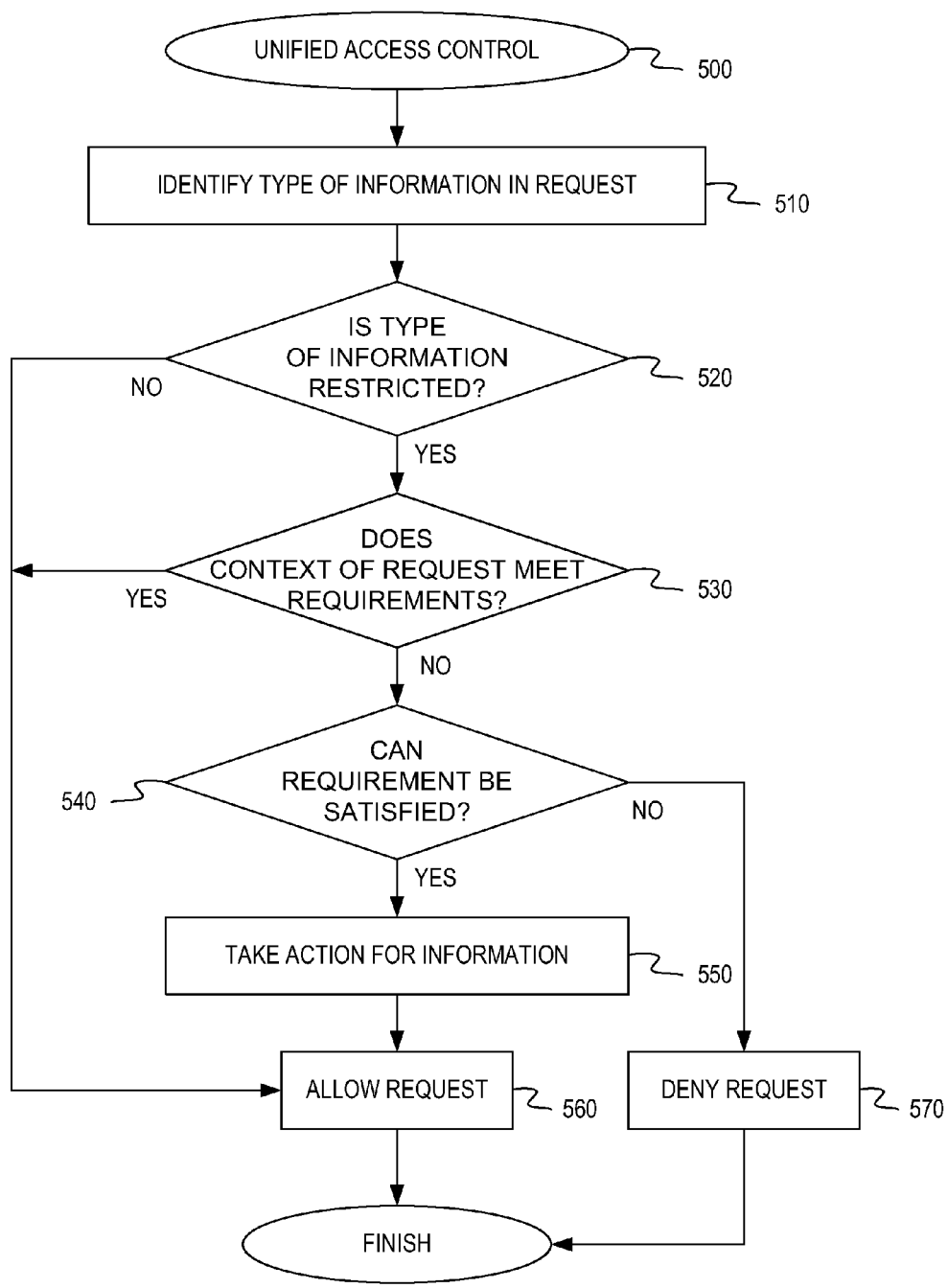
FIG. 5 is a diagram illustrating a unified access control method for cloud services, according to an embodiment.

FIG. 5 is a flow diagram illustrating a unified access control method for cloud services, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor and control requests for access to certain types of information from cloud services made by user devices. In one embodiment, method 500 may be performed by cloud service access and information gateway 300, as shown in FIG. 3 in connection with policy manager 122 as shown in FIG. 2.

Referring to FIG. 5, at block 510, method 500 identifies a type of information associated with a request. In one embodiment, the cloud service access request may be a request to download a certain document or file. In another embodiment, the request may be to upload or send information. When the request is received at gateway 300, information gateway module 304 may identify the type of information. The information may be classified in any number of different ways, such as corporate or personal, confidential or public, critical or non-critical, etc. Information gateway module 304 may use fingerprinting techniques, describing technology or some other method to identify the type of information in the request.

At block, 520, method 500 may determine if information control policies 344 have restrictions with respect to the type of information associated with the request. In one embodiment, certain types of data may have restrictions, such as corporate data, confidential data, critical data, or other types of data. Information control policies 344 may list these types of data and the corresponding restrictions. Information gateway module 304 may compare the identified type of data to the list to determine if there are associated restrictions.

If at block 520 method 500 determines that information control policies 344 have restrictions with respect to the type of information, at block 530, method 500 determines if the context of the received request meets the requirements for the identified type of data. In one embodiment, the requirements may be related to the context of a cloud service access request, such as the identity of the requestor, the device and network from which the request was received, the cloud service associated with the request, or other factors. For example, for a restricted type of data (e.g., confidential data), the information control policy may require that the request be received from a managed user device 102 over a secure network 106, or otherwise that the information be encrypted. Information gateway module 304 may compare the context information for the request, which may be received from identity access module 302, to the context requirements in information control policies 344 for the associated information type.

If at block 530 method 500 determines that the context of the request does not meet the requirements, at block 540, method 500 may determine if the requirements in policy 344 can be satisfied by remedying the deficiencies. For example, if confidential information is being requested by an unmanaged user device 104, but the information control policy 344 specifies that confidential information cannot be sent to an unmanaged user device unless it is first encrypted, the deficiency can be remedied. If however, the information control policy 344 specifies that confidential information cannot be sent to an unmanaged user device under any circumstances, then the deficiency cannot be remedied by gateway 300.

If at block 540 method 500 determines that the requirement can be satisfied, at block 550, method 500 may take action on the information to bring the request in compliance with the requirements of information control policy 344. For example, information gateway module 304 may encrypt or otherwise secure confidential information before sending it to unmanaged user device 104. In another embodiment, information gateway module 304 may take some other action depending on the requirements of information control policy 344. Once the action has been taken at block 550 to bring the request in compliance with the requirements of information control policy 344, at block 560, method 500 may allow the request. Gateway 300 may forward the request for access to the intended cloud service, such as private cloud service 132 or public cloud service 142, and the requested information may be returned. In addition, if at block 520, method 500 determines that the type of information is not restricted, or if at block 530, method 500 determines that the context of the request does meet the requirements of information control policy 344, method 500 may allow the request at block 560.

If at block 540, method 500 determines that the requirements of information control policy 344 cannot be satisfied, at block 570, method 500 may deny the request. As a result, the requesting device is not allowed to access the cloud service or receive the requested information.

Figure 6:
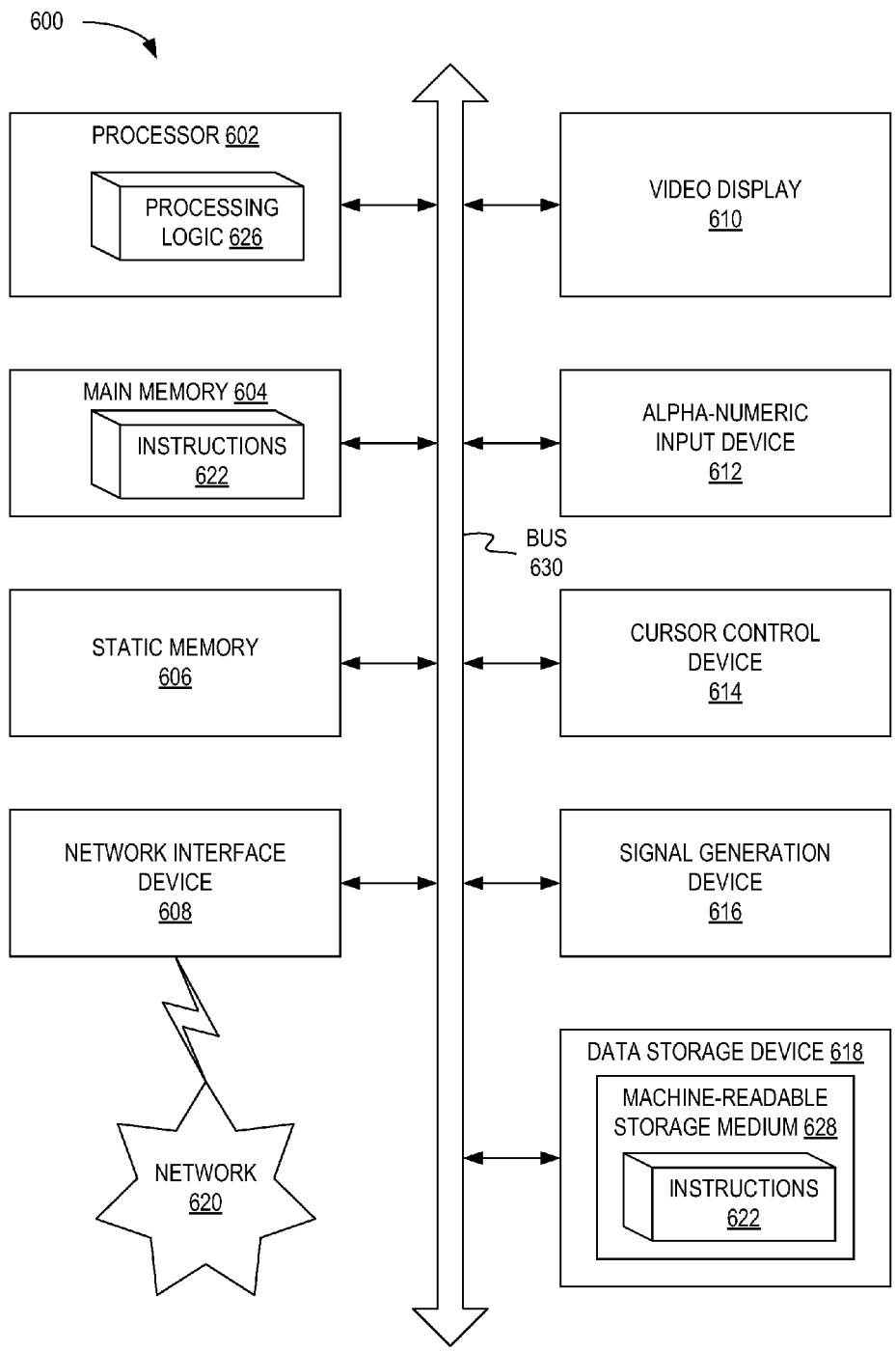
FIG. 6 is a block diagram illustrating one embodiment of a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent intelligence center 120 in FIG. 1 and or gateway 300 in FIG. 3.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 may be configured to execute the cloud service access and information gateway 300 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of gateway 300) embodying any one or more of the methodologies or functions described herein. The instructions 622 may also reside, completely or at least partially, within the main memory 604 and/or within processing logic 626 of the processor 602 during execution thereof by the computer system 600, the main memory 604 and the processor 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    receiving, from a user device, a request to access a cloud service to utilize a resource provided by the cloud service, wherein to utilize the resource, the user device is configured to at least one of request information from the resource or send information to the resource;
    in response to receiving the request, determining a context of the request to access the cloud service;
    comparing, by a processor, the context of the request to a cloud service access policy, the cloud service access policy to control utilization of the resource provided by the cloud service;
    if the context of the request satisfies the cloud service access policy, determining a type of the information associated with the request, wherein the type of information is determined using at least one of a non-reversible hash and signature-based detection;
    comparing, by the processor, the type of the information associated with the request to an information control policy, the information control policy to control what types of information are requested from the resource and sent by the user device to the resource in view of the context of the request to access to the cloud service; and
    if the type of the information satisfies the information control policy, granting the user device access to the cloud service.

2. The method of claim 1, wherein the context of the request comprises at least one of an identity of a user, a type of the user device, a type of network, or a type of the cloud service.

3. The method of claim 2, wherein the type of the cloud service comprises at least one of a public cloud service or a private cloud service.

4. The method of claim 2, wherein the type of the user device comprises at least one of a managed user device or an unmanaged user device.

5. The method of claim 2, wherein the type of network comprises at least one of a secure network or an unsecure network.

6. The method of claim 1, further comprising:
    if the context of the request does not satisfy the cloud service access policy, denying the request.

7. The method of claim 1, wherein the type of information associated with the request comprises at least one of confidential information or public information.

8. The method of claim 1, wherein comparing the type of information associated with the request to the information control policy comprises:
    determining if the type of information is restricted;

if the type of information is restricted, determining if the context of the request meets a requirement of the information control policy; and if the context of the request does not meet the requirement of the information control policy;

determining if the requirement can be satisfied.

9. The method of claim 8, further comprising:

if the type of information is not restricted, granting the user device access to the cloud service; and if the context of the request does meet the requirement of the information control policy, granting the user device access to the cloud service.

10. The method of claim 8, further comprising:

if the requirement can be satisfied, performing an action to satisfy the condition; and if the requirement cannot be satisfied, denying the request to access the cloud service.

11. The method of claim 10, wherein performing the action to satisfy the condition comprises encrypting the information associated with the request.

12. A system, comprising:

a memory; and a processor coupled with the memory to:

receive, from a user device, a request to access a cloud service to utilize a resource provided by the cloud service, wherein to utilize the resource, the user device is configured to at least one of request information from the resource or send information to the resource;

in response to receiving the request, determine a context of the request to access the cloud service;

compare the context of the request to a cloud service access policy, the cloud service access policy to control utilization of the resource provided by the cloud service;

if the context of the request satisfies the cloud service access policy, determine a type of the information associated with the request, wherein the type of information is determined using at least one of a non-reversible hash and signature-based detection;

compare the type of the information associated with the request to an information control policy, the information control policy to control what types of information are requested from the resource and sent by the user device to the resource in view of the context of the request to access to the cloud service; and if the type of the information satisfies the information control policy, grant the user device access to the cloud service.

13. The system of claim 12, wherein the context of the request comprises at least one of an identity of a user, a type of the user device, a type of network, or a type of the cloud service.

14. The system of claim 12, the processor further to:

if the context of the request does not satisfy the cloud service access policy, deny the request.

15. The system of claim 12, wherein the type of information associated with the request comprises at least one of confidential information or public information.

16. The system of claim 12, wherein when the processor compares the type of information associated with the request to the information control policy, the processor further to:

determine if the type of the information is restricted;

if the type of information is restricted, determine if the context of the request meets a requirement of the information control policy; and if the context of the request does not meet the requirement of the information control policy; determine if the requirement can be satisfied.

17. The system of claim 16, the processor further to:

if the type of information is not restricted, grant the user device access to the cloud service; and if the context of the request does meet the requirement of the information control policy, grant the user device access to the cloud service.

18. The system of claim 16, the processor further to:

if the requirement can be satisfied, perform an action to satisfy the condition; and if the requirement cannot be satisfied, deny the request to access the cloud service.

19. The system of claim 18, wherein performing the action to satisfy the condition comprises encrypting the information associated with the request.

20. A non-transitory computer readable storage medium including instructions that, when executed by a processor, cause the processor to perform operations comprising:

receiving, from a user device, a request to access a cloud service to utilize a resource provided by the cloud service, wherein to utilize the resource, the user device is configured to at least one of request information from the resource or send information to the resource;

in response to receiving the request, determining a context of the request to access the cloud service;

comparing, by a processor, the context of the request to a cloud service access policy, the cloud service access policy to control utilization of the resource provided by the cloud service;

if the context of the request satisfies the cloud service access policy, determining a type of the information associated with the request, wherein the type of information is determined using at least one of a non-reversible hash and signature-based detection;

comparing, by the processor, the type of the information associated with the request to an information control policy, the information control policy to control what types of information are requested from the resource and sent by the user device to the resource in view of the context of the request to access to the cloud service; and if the type of the information satisfies the information control policy, granting the user device access to the cloud service.

21. The non-transitory computer readable storage medium of claim 20, wherein the context of the request comprises at least one of an identity of a user, a type of the user device, a type of network, or a type of the cloud service.

22. The non-transitory computer readable storage medium of claim 20, the operations further comprising:

if the context of the request does not satisfy the cloud service access policy, denying the request.

23. The non-transitory computer readable storage medium of claim 20, wherein the type of information associated with the request comprises at least one of confidential information or public information.

24. The non-transitory computer readable storage medium of claim 20, wherein comparing the type of information associated with the request to the information control policy comprises:

determining if the type of information is restricted;

if the type of information is restricted, determining if the context of the request meets a requirement of the information control policy; and if the context of the request does not meet the requirement of the information control policy; determining if the requirement can be satisfied.

25. The non-transitory computer readable storage medium of claim 24, the operations further comprising:
if the type of information is not restricted, granting the user device access to the cloud service; and
if the context of the request does meet the requirement of the information control policy, granting the user device access to the cloud service.

26. The non-transitory computer readable storage medium of claim 24, the operations further comprising:
if the requirement can be satisfied, performing an action to satisfy the condition; and
if the requirement cannot be satisfied, denying the request to access the cloud service.

* * * * *